Nov. 4, 1958     J. E. CLEMENS ET AL     2,859,377
ELECTRONIC HIGH SPEED SHUTTER
Filed Sept. 21, 1955     4 Sheets-Sheet 1

INVENTORS
JOHN E. CLEMENS
BEN. B. JOHNSTONE
BY
ATTORNEYS

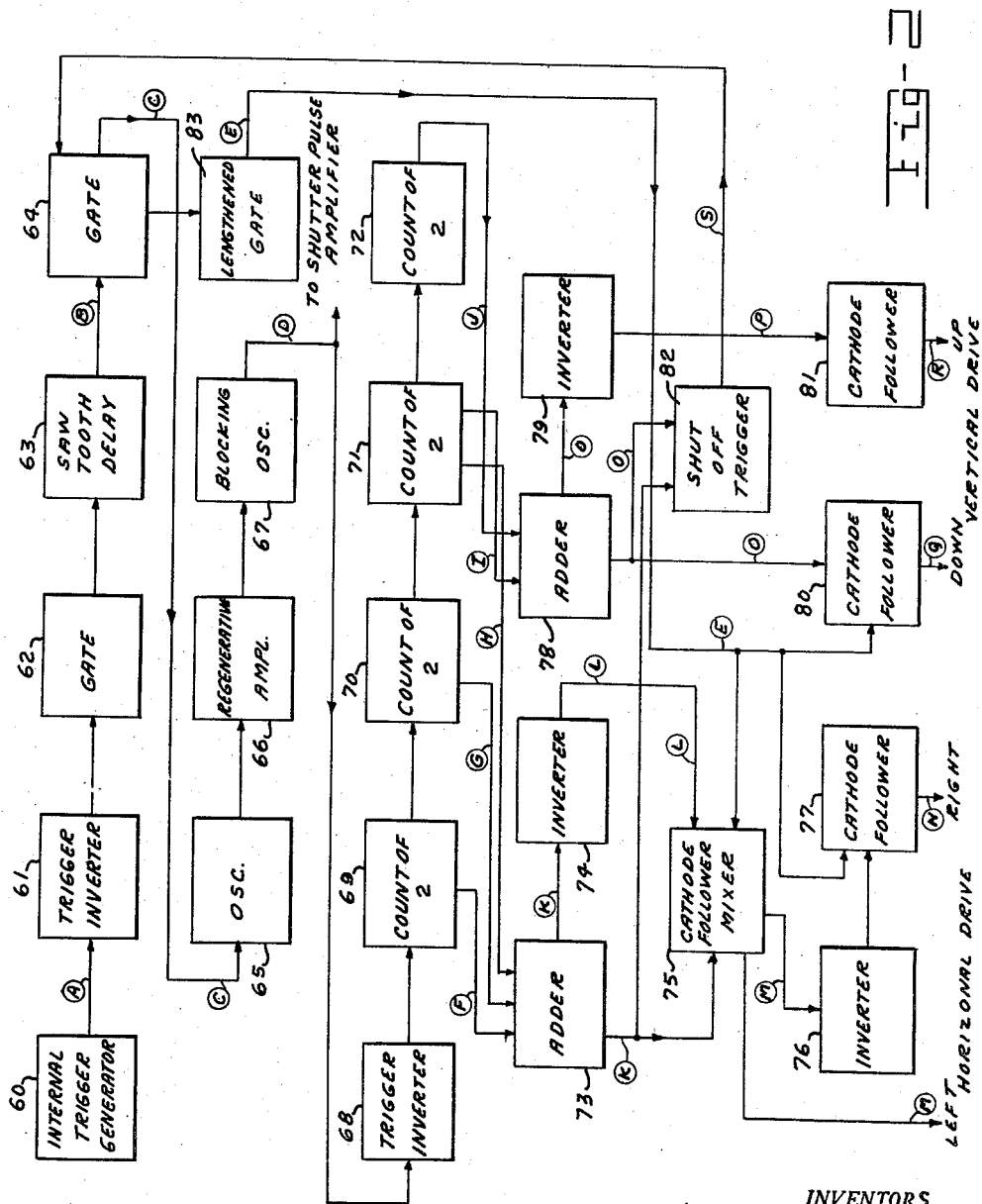

Nov. 4, 1958 J. E. CLEMENS ET AL 2,859,377
ELECTRONIC HIGH SPEED SHUTTER
Filed Sept. 21, 1955 4 Sheets-Sheet 3

INVENTORS
JOHN E. CLEMENS
BEN. B. JOHNSTONE
BY
ATTORNEYS.

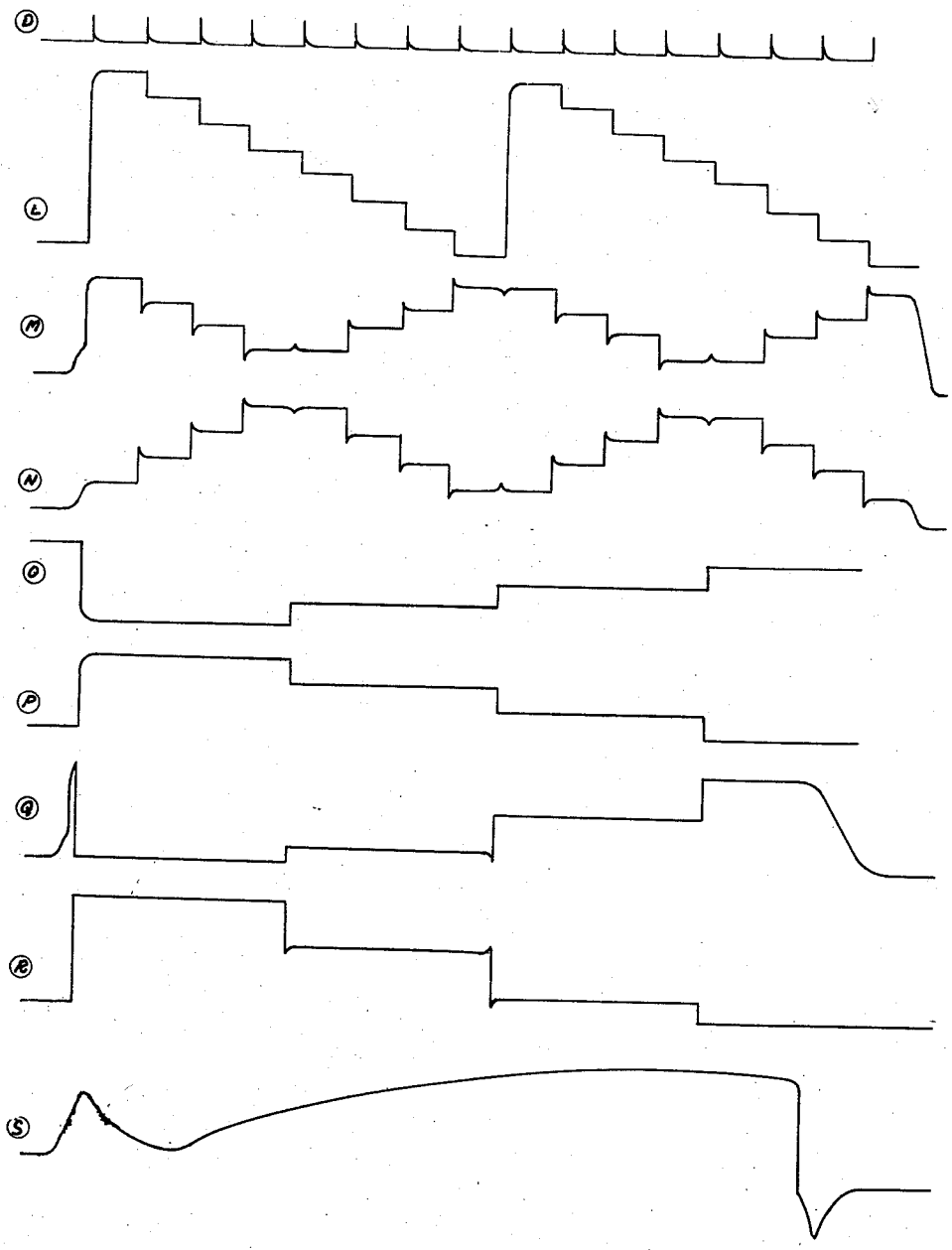

United States Patent Office 2,859,377
Patented Nov. 4, 1958

2,859,377

ELECTRONIC HIGH SPEED SHUTTER

John E. Clemens, Xenia, and Ben B. Johnstone, Dayton, Ohio

Application September 21, 1955, Serial No. 535,767

3 Claims. (Cl. 315—10)

(Granted under Title 35, U. S. Code (1952), sec. 266)

The invention described herein may be manufactured and used by or for the United States Government for governmental purposes without payment to us of any royalty thereon.

This invention relates to an electronic high speed shutter for use in very high speed photography.

Presently known devices which are capable of being utilized for the taking of high speed pictures by means of photographic techniques have many disadvantages as to size, weight, cost, and other factors. Devices based on pulsed light such as the Edgerton tube have limited brightness, limited frequency response, and generally require high rates of film travel. Spark photography presents the same problems. Other methods, depending upon a mechanical shutter or a rotating prsim, etc., require high rates of film travel to achieve reasonable speed and become severely limited in ultimate speed.

It is an object of the present invention to eliminate these difficulties of known devices.

It is a further object of this invention to obtain higher speed photographic exposure than has heretofore been possible.

It is a still further object of the invention to replace the conventional mechanical shutter by an electronic shutter which will not only give faster and more dependable action but will also afford a light flux gain over the ambient light.

In achieving these objects the present invention utilizes a cathode ray tube having a photosensitive cathode surface upon which can be focused by a suitable lens, an image of the optical phenomena upon which observations are to be made. The photons impinging upon this cathode eject electrons from its surface. These electrons are controlled in acceleration by a grid and are focused by an electromagnetic or electrostatic electron focusing lens. This focused beam of electrons can now be bent in one or two axes as desired by electromagnetic or electrostatic deflecting means. The beam of electrons then falls on the phosphor of a fluorescent screen where the original image is reformed as photons at some frequency spectrum depending upon the kind of phosphor used. The image on the phosphor can then be photographed by a still or movie camera. If desired, the beam of electrons could be made to fall directly on a photographic plate by placing the photographic plate in the vacuum or by letting the electrons come through a Leonard window.

The phosphor or fluorescent screen may be large enough to cover an area of "$n$" picture frames in one axis and "$m$" picture frames in the other axis. Thus, if the proper step voltage is applied to the deflecting means it will be possible to move the image intermittently over the phosphor in successive steps. The time interval of each picture frame may be controlled by deflecting the beam with the aid of suitable electrical equipment.

It can be easily seen that ($n \times m$) picture frames can be made while the camera is using only one camera frame. Thus the camera frame rate is slowed down to ($1/n \times m$) of the rate which would be required if the camera were to catch each individual picture frame on an individual camera frame. Also, the shutter becomes simply the control of an electron beam by means of suitable electrical equipment. Speeds of 100,000 picture frames per second are easily obtainable and much higher speeds of the order of 1 to 10 million frames per second can be accomplished with special attention to the electronics.

The same basic principles can be applied with a differently shaped deflection voltage to utilize the deflection system to synchronize an optical image with the speed of a continuously moving film which in connection with a fast phosphor or with a Leonard window would yield the same results as a rotating prism for stabilization of the image relative to the film.

The invention will be more fully understood from the following specification and drawings wherein:

Figure 2 is a detailed block diagram of one type of synchronizer and shaper circuit which may constitute the block 30 of Figure 1.

Figures 3 and 3a show the electrical wave forms existing at various points in the circuit of Figure 2.

Figure 1:
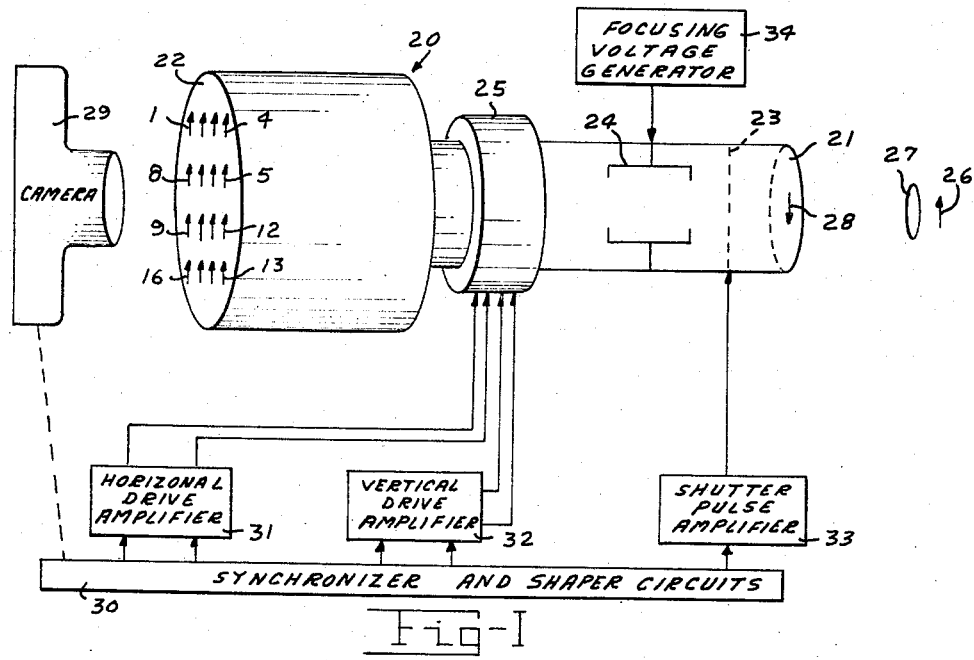
Figure 1 is a schematic and block diagram of the present invention.

Turning now to Figure 1 there is shown an elongated evacuated tube 20 having a photosensitive cathode 21 and a fluorescent screen 22 which may consist of any of the usual phosphors conventional in cathode ray tubes and which also serves as a final accelerating anode. Anode 22 is supplied with a fixed positive potential by any conventional means (not shown). Tube 20 is also provided with a grid 23 which may, for example, be a mesh structure, and with an electron focusing lens 24 supplied from a voltage source 34. Tube 20 is further provided with an electromagnetic deflection yoke 25 which is positioned along the axis of the tube between the focusing lens 24 and the fluorescent screen 22.

A camera 29 is arranged to photograph the images appearing on screen 22. Although camera 29 may be a still camera it is usually desirable that it be a movie camera in order to take a rapid sequence of pictures. The frame rate of camera 29 is synchronized either by internal adjustment or by mechanical or electrical means with the operation of the tube 20 in a manner to be discussed in detail below. In general synchronizer and shaper circuits 30 provide synchronization with the horizontal and vertical drive voltages applied to the horizontal drive amplifier 31 and to the vertical drive amplifier 32 respectively as well as with pulses supplied to the shutter pulse amplifier 33. The deflection drive voltages are applied to yoke 25 in a manner well understood in the art and the output of shutter pulse amplifier 33 is applied to grid 23.

In operation the optical image of an object 26 which it is desired to photograph is focused by any suitable optical lens system 27 upon the photosensitive cathode 20; optical image 28 thus formed on cathode 21 causes electrons to be ejected therefrom in a pattern determined by and reproducing image 28. Focusing voltage generator 34 which has its output applied to electron lens 24 is adjusted so that the beam of electrons ejected from cathode 21 is brought to focus on screen 22. An optical image of the object is thus reproduced by screen 22 which may in turn be photographed.

The electron image falling on screen 22 may be moved through a sequence of positions such as positions 1 through 16 shown in Figure 1 by application to deflection yoke 25 of suitably synchronized stepping voltages from the horizontal and vertical drive amplifiers 31 and 32. While sixteen such image positions are shown in Figure 1 it is of course to be understood that any desired number or pattern of image positions could be achieved by suitable design of the synchronizer and shaper circuits 30.

Figure 3:
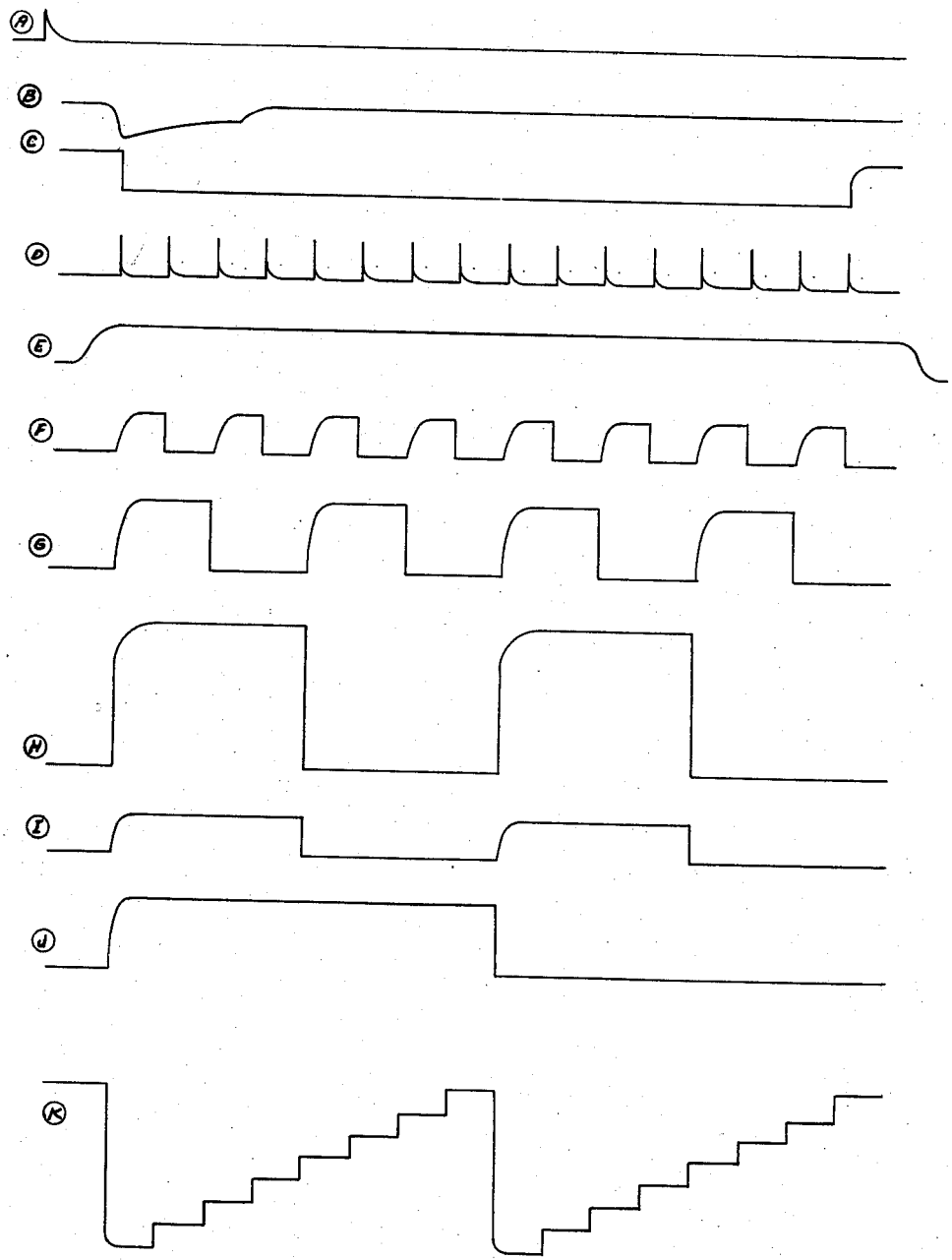

Referring now to Figure 2, there is shown for purposes of illustration only a detailed block diagram of one type of synchronizer and shaper circuit which may constitute the block 30 used to provide deflection voltages to achieve the image pattern shown in Figure 1. It is of course understood that other suitable circuits could be devised to provide either this pattern or any other type of similar pattern which might be desirable in a particular application. The electrical wave forms at various points in the circuit of Figure 2 are shown in Figures 3 and 3a, the wave forms of the latter figures being lettered to indicate by corresponding letters the points at which they appear in Figure 2.

Turning now to Figure 2, the synchronizer and shaper circuit 30 of Figure 1 may consist of an internal trigger generator 60 which could, for example, be a free-running multivibrator having a frequency equal to the frame rate of movie camera 29. This equality may be achieved either by simple internal adjustment of the frame rate of camera 29 or by any suitable electrical or electromechanical linkage between trigger generator 60 and camera 29. Of course, if the camera 29 is a still camera it is in effect equivalent to a single frame of a movie camera and only the 16 or other predetermined number of images for a single frame would be recorded.

The output A of trigger generator 60 is applied to a trigger inverter 61 which may be a conventional pulse amplifier and thence to a gate 62 which may be a one-shot multivibrator and to the saw tooth delay circuit 63. Circuit 63 in turn has an output as shown at B which is applied to another gate 64. Gate 64 may be a bistable multivibrator controlled by feedback in a manner to be described below and has an output as indicated at C. Output C is used to control the operation of an oscillator 65 in tandem with a regenerative amplifier 66 and a blocking oscillator 67. Amplifier 66 raises the power level of the output of oscillator 65 to the point where it is sufficient to control blocking oscillator 67 which in turn has an output as shown at D. It should be noted that elements 60 through 67 are not per se critical to the invention but could be replaced by any other suitable electronic means for obtaining a first trigger pulse such as shown at A and a second trigger pulse such as shown at D. It will be noted however that the frequency of the pulses A must be a predetermined submultiple of the frequency of pulses D, the ratio in this case being 1 to 16, i. e., the ratio of picture frame rate to camera frame rate.

Pulses D are applied directly to the shutter pulse amplifier 33 of Figure 1 which inverts the shown positive polarity of pulses D and applies them to grid 23 as blanking pulses to prevent electron current from flowing during the period of time when the image on screen 22 is being moved from one position to another. Pulses D are also applied to a trigger inverter 68 arranged in tandem with four count of two circuits 69, 70, 71 and 72. Circuits 69 to 72 may be any conventional type of scaling or counting circuits such as the flip-flop type, for example, and of course the inverter 68 would not be necessary if the count down circuits were designed to be triggered by positive pulse.

Output F from count down circuit 69, output G from count down circuit 70 and output H from count down circuit 71 are applied to adder 73 to produce an output K from said adder 73. Output K is applied both to an inverter 74 and to a cathode follower mixer 75. Output L from inverter 74 is also applied to mixer 75 and the output M of mixer 75 is applied to one channel of what may be a push-pull horizontal drive amplifier 31. Output M is also applied to an inverter 76 and thence to cathode follower 77 which has an output N of opposite polarity to the output M and is fed to the other channel of the push-pull drive amplifier 31 in order to provide the proper horizontal deflection for the electron image.

Output I of count down circuit 71 and output J of count down circuit 72 are applied to adder 78 which has an output O. This output O is applied to inverter 79 which has an output P which is in turn applied to cathode follower 81. Cathode follower 81 has an output R which goes to one channel of the push-pull vertical drive amplifier 32. Output O from adder 78 is also directly applied to cathode follower 80 which has an output Q which is in turn applied to the other channel of vertical drive amplifier 32.

Output K from adder 73 and output O from adder 78 are also applied to shut off trigger generator 82 which may be a coincidence circuit which levels off to emit a delayed pulse when both of its inputs O and K are at a predetermined maximum value. From observation of the wave forms O and K and from comparison with trigger pulses D which have been shown in both Figures 3 and 3a for convenience, it will be noted that this condition occurs when the last position of the sequence of the different positions on screen 22 has been reached. Shut-off trigger circuit 82 has an output S which is shown as the transient response of the particular coincidence circuit constructed but obviously could be a pulse of any suitable shape. Output S is applied as feedback to the gate 64 which, as noted, may be a bistable multivibrator, and returns the gate 64 to a state in which it can again be triggered by a pulse B in the next overall cycle of operation of the circuit. The output of gate 64 is also applied to a lengthened gate circuit 83 which has an output E. This output E is used to stabilize and sharpen the operation of cathode follower mixer 75, of cathode follower 77, and of cathode follower 80. It will, of course, be understood that the feedback control of the gate 64 and the stabilization of mixer 75 and the output circuits 77 and 80 are merely refinements which have been found to be desirable for high speed operation but are not critical to the basic concept of even the particular synchronizer and shaper circuit shown for purposes of illustration.

It will be noted from a comparison of the horizontal drive voltages M and N and the vertical drive voltages O and P with the image position pattern on screen 22 as shown in Figure 1, that the image is first positioned in the upper left hand corner as shown at 1, is then stepped horizontally to position 4 and is then moved vertically down to the next row in position 5 and thence back in three steps in the opposite direction to position 8. The image is then moved vertically down to position 9 across to position 12, down to position 13, and back across to position 16 in similar fashion. Thus it will be seen that the level of the horizontal deflection voltage changes four times while the level of the vertical deflection voltage changes once. Such a zig-zag sequence, 4 x 4 arrangement of image positions is convenient and requires a minimum of deflection circuit power input.

If camera 29 is a still camera this circuitry provides sixteen images on a single plate. If camera 29 is a synchronized movie camera this circuitry provides sixteen picture frames per camera frame and hence slows down the necessary frame rate or decreases the exposure time by a factor of sixteen. It will be observed that by suitable design of camera and tube this factor could be greatly increased.

Furthermore, the actual exposure time is easily controlled by purely electronic control of the length of time the image is in any one position on the screen quite independently of the maximum camera frame rate obtainable since it would obviously be possible to use a long blanking pulse at the end of each sequence in order to accommodate the related design parameters of screen size, image size and exposure time, and camera frame rate.

In the embodiment shown the film is in a fixed position for a first relatively large period of time determined by the frame rate of the camera. The image on the screen is held stationary in one position of the sequence for a second period of time which determines the exposure time and is small by comparison to the first period of time and is then moved to the next position during a third period of time which is small even by comparison to the second period of time. In continuous operation it will be obvious that the sum of the second and third periods of time multiplied by the number of picture frames per camera frame must equal the first period of time but a suitable delay period can be introduced if desirable. It should also be noted that tube 20 could be gated "on" by positive pulses on grid 23 rather than gated "off" by negative pulses. Better results have, however, been achieved by the latter technique.

Figure 4:
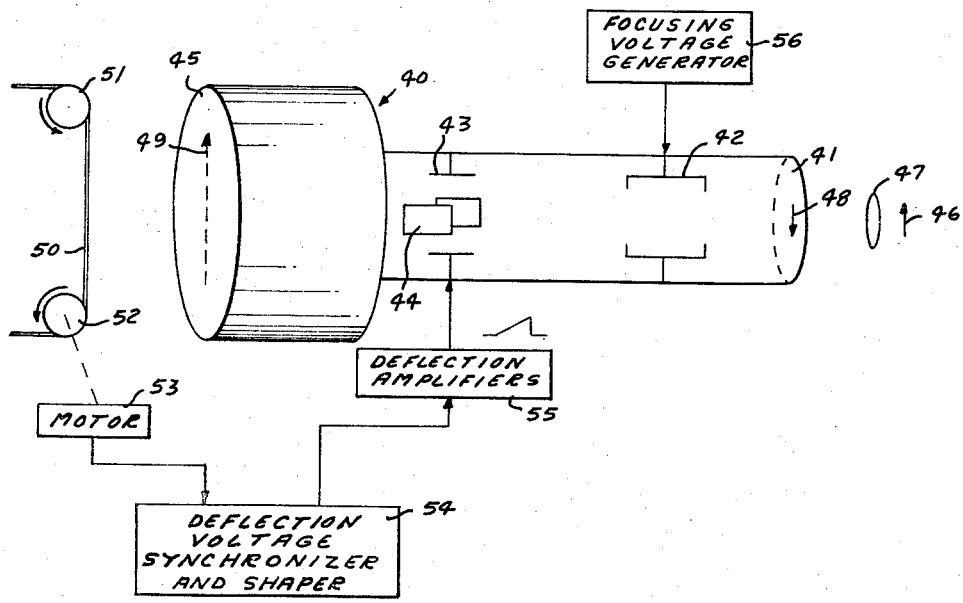
Figure 4 is a schematic and block diagram of the invention as applied to the stabilization of an image relative to a continuously moving film.

Turning now to Figure 4 there is shown an embodiment of the invention utilizing a tube 40 having a photosensitive cathode 41, electron focusing lens 42, electrostatic vertical deflection plates 43 and horizontal deflection plates 44, and a fluorescent screen 45. A continuously moving film 50 is supported by rollers 51 and 52 which in turn are driven by motor 53. The film 50 is arranged to record the optical image of the screen 45. In operation the optical image 48 of object 46 is focused by any suitable optical lens 47 on photo-sensitive cathode 41. As in the previous embodiment an electron beam is emitted from cathode 41 in a pattern reproducing the image 48 and is focused by electron lens 42 and voltage source 56 upon screen 45 which reproduces the optical image. The horizontal deflection plates 44 may be supplied from a source of fixed voltage, not shown, and are used simply to center the image 49 on screen 45 so that it will register with continuously moving film 50. The motor 53 which drives film 50 may be synchronized in any suitable manner with the voltage which is applied to the vertical deflection plates 43. For example voltage synchronizer and shaper 54 might consist of a linear potentiometer arranged in the form of a toroid and having a wiper mechanically driven by motor 53. Assuming that one end of the potentiometer were connected to a fixed source of voltage and that the wiper rotated continuously from the low to the high end of the potentiometer thence across an insulating gap and back to the low end, it is obvious that a saw tooth voltage synchronized with the motion of film 50 would be applied to deflection amplifier 55. Depending upon the characteristics of the tube 40 used, it is a simple matter of design to adjust the amplitude and period of such a saw tooth deflection voltage so that the image 49 will follow the motion of film 50 for any desired exposure time. The vertical trailing edge of the saw tooth deflection voltage provides a flyback period. In both the embodiment of Figure 1 and of Figure 4 this vertical trailing edge can be made steep enough so that the blanking voltage which in Figure 1 is applied to grid 23 is not absolutely essential. If no blanking voltage is used a very short flyback time and a low persistence phosphor are necessary. In both embodiments however such a blanking voltage reduces stray dark time currents and gives cleaner operation. It should also be noted that the illustrative electromagnetic deflection in Figure 1 and electrostatic deflection in Fgure 4 is purely a matter of design and that either deflection system could be used in either embodiment. Furthermore, it should be noted that either screen 22 of Figure 1 or screen 45 of Figure 4 could be replaced by a stationary or a moving photographic film respectively within the tube's vacuum. This would involve changes only in mechanics design rather than in the basic concept of the invention since the photographic film is sensitive to exposure to either an electron image or to a light image.

In all of the embodiments discussed above a light flux gain over ambient light is achieved by virtue of the energy imparted to the electron beam by the power input to the accelerating anodes. Gains of as much as 20 to 1 have been realized in apparatus tested. Hence the high speeds obtainable with the electronic shutter are practicable for use in difficult ambient light conditons.

Having thus fully described an illustrative embodiment of our invention what we claim is:

1. High speed photographic apparatus comprising, an elongated evacuated tube having an electron emitting photosensitive cathode at one end thereof and an electron sensitive image reproducing means at the other end thereof, means to cas an optical image of an object to be photographed on said cathode; a mesh grid, electron focusing means, and electron deflecting means positioned between said cathode and said image reproducing means; means to shape and synchronize control voltages, said means comprising, a first source of trigger pulses, a gate to which said trigger pulses are applied, a pulse generator controlled by said gate, means to apply the output of said pulse generator to said grid as a blanking voltage, a plurality of count down circuits connected in tandem with said pulse generator and with each other, each of said circuits having the same count down ratio, a first added connected to combine the outputs of a first group of said count down circuits, a second adder connected to combine the outputs of a second group of said count down circuits, means to invert the output of said first adder, mixing means to combine the original and the inverted outputs of said first adder, means to apply the output of said mixer to said electron deflecting means as a horizontal drive, means to apply the output of said second adder to said electron deflecting means as a vertical drive, and means controlled by the output of said first and second adder to generate a shut off trigger, said shut off trigger being applied to said gate.

2. High speed photographic apparatus having an elongated evacuated tube having an electron emitting photosensitive cathode at one end thereof and an electron sensitive image reproducing means at the other end thereof, means to produce an optical image of an object to be photographed on said cathode; electron focusing means and horizontal and vertical electron deflecting means positioned between said cathode and said image reproducing means, means for sequentially reproducing images in a preselected pattern on said image reproducing means comprising a synchronizing and shaping circuit including a first trigger pulse generator having a pulse rate equal to the pattern rate, a gate operated by said first trigger pulse, a second trigger generator responsive to said gate, said second trigger generator having a pulse rate equal to the image rate, a plurality of count of two circuits connected in series circuit relation to said second trigger generator, a first adder circuit, connections for applying the output of a first group of said count of two circuits to said first adder device, circuit means applying the output of said first adder circuit to said horizontal deflecting means to determine the horizontal position of said image reproduction, a second adder circuit, connections for applying the output of a second group of said count of two circuits to said second adder circuit, circuit means applying the output of said second adder circuit to said vertical deflecting means.

3. High speed photographic apparatus having an elongated evacuated tube having an electron emitting photosensitive cathode at one end thereof and an electron sensitive image reproducing means at the other end thereof, means to produce an optical image of an object to be photographed on said cathode; a grid between said cathode and said image reproducing means, electron focusing means and horizontal and vertical electron deflecting means positioned between said cathode and said image reproducing means, means for sequentially reproducing images in a preselected pattern on said image reproducing means comprising a synchronizing and shaping circuit including a first trigger pulse generator having a pulse rate equal to the pattern rate, a gate operated by said first trigger pulse, a second trigger generator responsive to said gate, said second trigger generator having a pulse rate equal to the image rate, circuit means applying the pulses of said second trigger generator to said grid, a plurality of count of two circuits connected in series circuit relation to said second trigger generator, a first adder circuit, connections for applying the output of a first group of said count of two circuits to said first adder circuit, circuit means applying the output of said first adder to said horizontal deflecting means to determine the horizontal position of said image reproduction, a second adder circuit, connections for applying the output of a second group of said count of two circuits to said second adder, circuit means applying the output of said second adder to said vertical deflecting means to determine the vertical position of said image, a shutoff trigger generator, connections from said first and second adders to said shutoff trigger generator and a shutoff connection from said shutoff trigger generator to said first gate.

References Cited in the file of this patent
UNITED STATES PATENTS

| | | |
|---|---|---|
| 2,535,810 | Oliver | Dec. 26, 1950 |
| 2,537,105 | Urick et al. | Jan. 9, 1951 |
| 2,539,370 | Mayo | Jan. 31, 1951 |
| 2,596,741 | Tyler et al. | May 13, 1952 |
| 2,603,418 | Ferguson | July 15, 1952 |
| 2,645,169 | Hayward et al. | July 14, 1953 |
| 2,808,768 | Squassoni | Oct. 8, 1957 |

OTHER REFERENCES

"Program Recording" by King et al., Electronic, 1950, pages 90–95.